April 10, 1945.  G. A. BURBRIDGE  2,373,536
PHOTOGRAPHIC APPARATUS
Filed Feb. 13, 1943  2 Sheets-Sheet 1
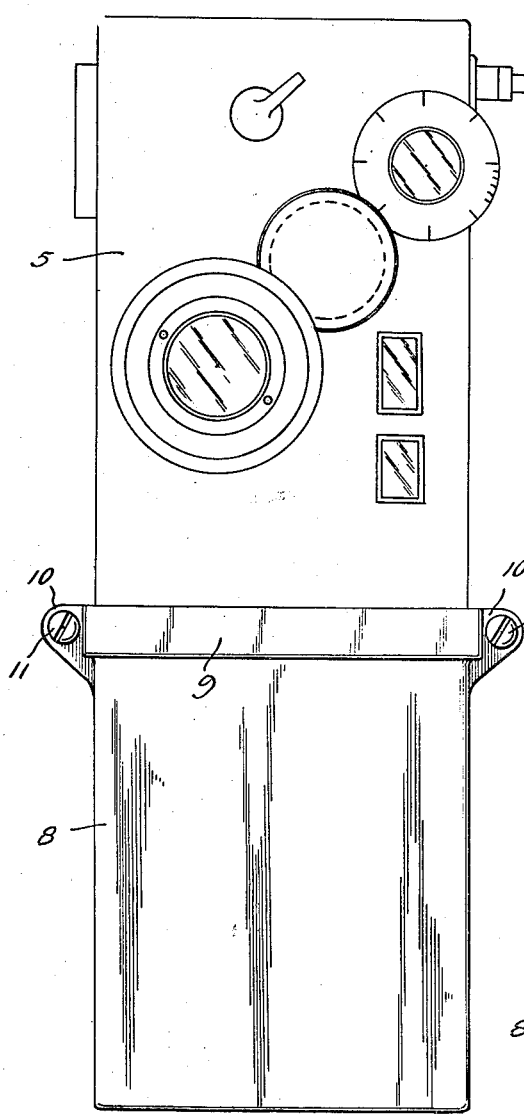
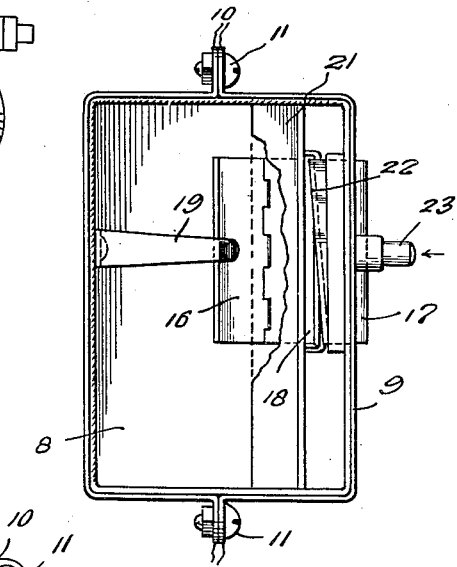
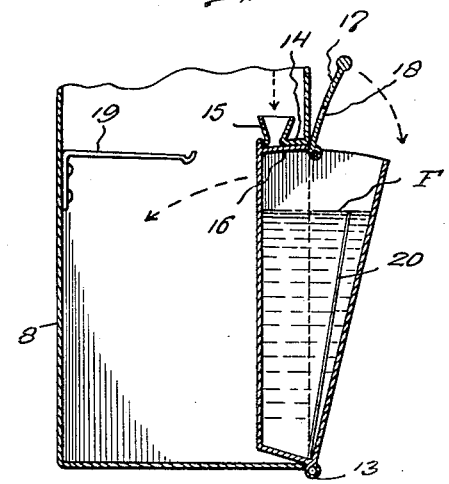
Inventor
Gaylord A. Burbridge,
By J. Stanley Burch
Attorney April 10, 1945.  G. A. BURBRIDGE  2,373,536
PHOTOGRAPHIC APPARATUS
Filed Feb. 13, 1943  2 Sheets-Sheet 2

Inventor
Gaylord A. Burbridge,
By J. Stanley Burch
Attorney

Patented Apr. 10, 1945

2,373,536

UNITED STATES PATENT OFFICE 2,373,536

PHOTOGRAPHIC APPARATUS

Gaylord A. Burbridge, Oklahoma City, Okla.

Application February 13, 1943, Serial No. 475,819

2 Claims. (Cl. 95—13)

My invention relates to improvements in photographic apparatus, and the primary object of the present invention is to provide improved means whereby photographs taken by a camera forming part of the apparatus, are developed inside the apparatus, so that the photographs may be developed in daylight and the necessity of the usual dark room is dispensed with.

More specifically, the present invention contemplates the provision of photographic apparatus including a conventional film-holding camera having its lower film receiving roller omitted and provided in the bottom thereof with a slot through which the exposed portion of the film may pass, in combination with a casing applied to the bottom of the camera and provided with a container into which the exposed portion of the film may pass from the camera for being developed.

A further object of the present invention is to provide an apparatus of the above character in which the casing is provided with means for severing the exposed portion of the film that passes into the casing so that it may drop into the container for being developed, said container being movable to a position outside the casing, whereby the developed film section may be removed from the container for immediate rinsing. Provision is made for preventing entrance of light into the casing so that the undeveloped portion of the film from the camera may not be ruined from exposure to light while the container is in its position outwardly of the casing.

Other objects and features of the present invention will become apparent from the following description when considered in connection with the accompanying drawings, in which:

Figure 1 is a front elevational view of a photographic apparatus embodying the present invention.

Figure 4 is a horizontal section taken substantially upon line 4—4 of Figure 3; and Figure 5 is a fragmentary section showing the lower portion of the apparatus as illustrated in Figure 3, but with the container for developing fluid pulled to its position outwardly of the casing.

Figure 3:
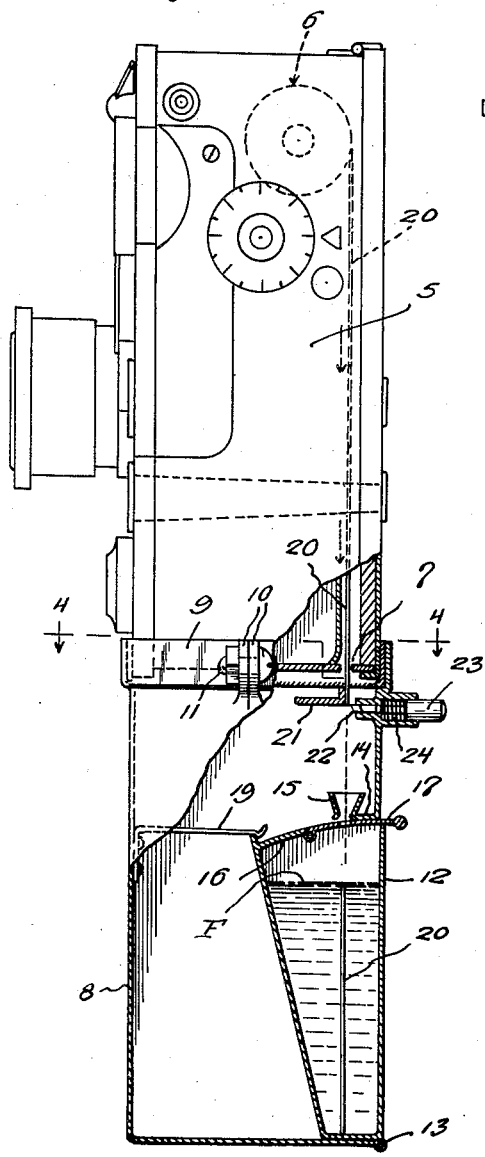
Figure 3 is a side elevational view of the same, partly broken away and in section.
Figure 2:
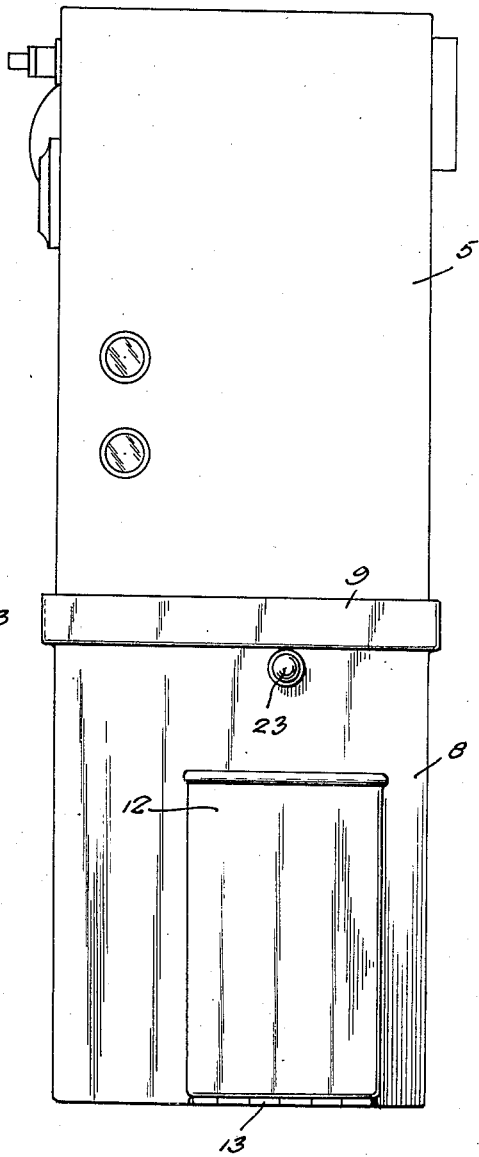
Figure 2 is a rear elevational view thereof.

Referring in detail to the drawings, the present photographic apparatus includes a conventional film-holding camera 5 having the usual upper film-holding roller indicated by dotted lines at 6 in Figure 3, but having its lower usual film receiving roller removed or omitted and provided in the bottom with a slot 7 through which the film may pass after exposure.

Applied to the bottom of the camera so as to provide a light tight joint therewith is a casing 8 having a dark interior surface. This casing may be formed of metal and enlarged at the top as at 9 for feeding reception of the lower end of the camera 5, such enlarged portion 9 being split at opposite sides and provided with ears as at 10 adapted to be drawn together by clamping bolts 11 so as to secure the casing 8 upon the bottom of the camera. Arranged within the rear lower portion of casing 5 is a container 12 for developing fluid F, which container normally occupies a position within the casing 5 so that the exposed portion of the film passing from the camera through the slot 7 may drop into said container 12 for being developed. Container 12 is also arranged so that it is movable rearwardly to a position outside the casing 8 whereby the developed film portion or section in said container 12 may be removed for being immediately rinsed in a separate container for rinsing fluid separate from the apparatus. As shown, the container 12 may be hinged as at 13 at its bottom to the bottom wall of the casing 8 and of a size to fit an opening in the rear wall of said casing 8. Thus, container 12 may be swung inwardly to the position in Figure 3 wherein it is wholly within the casing 5 or outwardly to a position partially outside the casing 5 as in Figure 5. The rear wall of casing 8 is provided at the top of the opening for container 12 with a forward extension 14 having an opening surrounded by an upstanding funnel member 15 which receives the depending end of the film to guide it into the container 12. The container 12 has a top wall including a fixed forward section 16 and a hinged lid or rear section 17. The latter is automatically closed by engagement with the casing 8 when the container 12 is swung inwardly of said casing 8, and is provided with a slot 18 arranged to register with the funnel member 15 when the container 12 is in inwardly swung position. Thus, the film may pass through funnel member 15 and slot 18 into container 12 when the latter is in inwardly swung position as shown in Figure 3. Suitable means such as a spring catch 19 may be provided for engagement with the top of container 12 for releasably holding it in its inwardly swung position, and the hinge for the lid section 17 of the container 12 may be of the friction type so that when said lid section 17 is swung upwardly to open position with the container 12 in its outwardly moved position of Figure 5, said lid section 17 will engage the rear wall of the casing 8 and serve to releasably retain the container 12 in its outwardly moved position. When container 12 is in such outwardly moved position, it will be seen that the fixed forward section 16 of the top wall of container 12 will overlie and close the funnel member 15 so that any light admitted into container 12 may not pass upwardly through said funnel member 13 to ruin the undeveloped film portion that may be disposed at the top of casing 8 adjacent the slot 7.

Provision is made for severing the lower portion of the film after it passes through the slot 7 so that a desired section of the film may be cut from the rest of the roll of film for dropping through the funnel member 13 into the container 12. This severed section is indicated at 20 and will be a section upon which one exposure has been made. The film cutting or severing means preferably consists of a fixed blade 21 suitably mounted in the top of the casing 8 directly below the slot 7 in the bottom of camera 5 and at the forward side of the film after it passes through said slot 7, and a movable cutter blade 22 mounted in the rear wall of casing 8 and adapted to be grooved inwardly for cooperating with fixed blade 21 in cutting the film so that a section below the cutter will drop into container 12. The movable cutter 22 is preferably associated with an operating knob or stem 23 projecting from the rear wall of casing 8 and having spring means associated therewith as at 24 for normally retracting the cutter 22 to a position rearwardly of the path in which the film passes from the slot 7 towards the funnel member 15. By pressing inwardly on the stem or knob 23, the cutter 22 may be operated to sever the film in an obvious manner.

In operation, provision is made for turning the film holding roller 6 so as to unwind the film therefrom into the usual exposure position. After exposure, the film is further unwound so as to lower the exposed film section through the slot 7 into the upper portion of casing 8 and through funnel member 15 into the top of container 12. Cutter 22 is then operated to sever this exposed section or portion of the film from the rest of the film strip, whereby such severed portion or section of the film will drop into the container 12 as shown in Figure 3 for being developed by the fluid F in said container 12. As sufficient time has elapsed for development of the film section 20, the container 12 is moved to the outwardly shifted position of Figure 5 so that the developed film section can be withdrawn and immediately placed in a tank of rinsing fluid separate from the apparatus. No dark room is needed, and the finished photograph is produced by a continuous operation in a very short time.

The construction is simple, inexpensive to manufacture, easy to use, and otherwise well adapted for successful commercial use.

What I claim as new is:

1. In combination with a conventional film-holding camera having an upper film containing roller adapted to be rotated for unwinding the film therefrom, said camera having a slot in the bottom wall thereof through which the unwound film may pass after exposure, of a casing fitted over the bottom portion of the camera and into which the exposed film portion may pass from the camera through said slot, a container for developing fluid movable through a wall of the casing to assume an inward position to receive the exposed film portion or an outward position to permit removal of the film portion for rinsing, means within the casing above said container for severing the exposed film portion from the rest of the film in the camera so that the severed portion may drop into the container for being developed, a catch in the casing engageable with the top of the container to releasably retain the container in the inward position with respect to the casing, and a hinged lid for the container having a friction hinge and engageable with the wall of the casing for releasably retaining the container in the outward position with respect to the casing.

2. The construction defined in claim 1, in combination with a film-guiding funnel mounted in the casing, said container having a fixed top wall section arranged to close the funnel and exclude light from the casing when the container is in its outward position, said lid having a slot for passage of the film from the funnel into the container when the latter is in its inward position.

GAYLORD A. BURBRIDGE.